United States Patent [19]
Harrison et al.

[11] Patent Number: 5,005,811
[45] Date of Patent: Apr. 9, 1991

[54] RESILIENT ROLLING TORUS FOR A LOAD-CUSHIONING DEVICE

[75] Inventors: Pamela J. Harrison, Pleasant Lake; Richard D. Hein, Wabash, both of Ind.

[73] Assignee: GenCorp Inc., Fairlawn, Ohio

[21] Appl. No.: 416,184

[22] Filed: Oct. 2, 1989

[51] Int. Cl.$^5$ ............................................. F16F 7/00
[52] U.S. Cl. .................................. 267/220; 248/560; 267/141.1; 267/141.5; 267/292; 267/294
[58] Field of Search ............. 267/292, 293, 294, 220, 267/219, 141, 141.1I, I.2, 141.3, 141.4, 141.5, 140.5, 153; 188/129, 168; 248/636, 562, 560

[56] References Cited

U.S. PATENT DOCUMENTS

| | | | |
|---|---|---|---|
| 2,386,463 | 10/1945 | Hile | 267/140.5 |
| 2,819,060 | 11/1958 | Neidhart | 188/129 |
| 3,037,787 | 6/1962 | Gottschald | 267/297 X |

FOREIGN PATENT DOCUMENTS 896762  5/1962  United Kingdom ............. 267/141.5

OTHER PUBLICATIONS

Svenska Uni-Cardan AB, "Aquadrive Marine Engine Mounts", 1985.

Primary Examiner—Matthew C. Graham

[57] ABSTRACT

A device for cushioning impact loads is described as employing unique rolling rubber rings for compressively engaging adjacent conical surfaces of the device as the surfaces come closer together. The ring has a pair of longer toroidal segments which are connected by a pair of shorter toroidal segments which have cross-sections which are substantially smaller than those of the longer segments, such that the ring can be designed to resist different lateral forces imparted to the ring.

5 Claims, 3 Drawing Sheets

RESILIENT ROLLING TORUS FOR A LOAD-CUSHIONING DEVICE

BACKGROUND OF THE INVENTION

The invention relates to devices for resiliently supporting loads or dampening impact loads and especially to the resilient elastomeric rings which are used in such devices.

U.S. Pat. Nos. 2,819,060 and 2,819,063 are typical of the many patents which relate to such devices. The rubber rings used in these devices have uniform cross-sections and are primarily designed to resiliently resist unidirectional or bidirectional loads along the center axis of the rings. Further, because the rings have a uniform symmetry, they cannot be dynamically tuned, so to speak, to absorb different lateral loads imposed, for example, on rings at different locations.

The present invention is directed to a resilient elastomeric ring which is used in a load-cushioning device useful in an automobile. The ring is provided with different size cross-sections in opposing arcuate sections of the ring to accommodate different lateral loads imposed on the device.

Briefly stated the present invention is directed to the provisions of a resilient elastomeric torus or ring and the angular relationship of the ring supporting means relative to the vertical axis on which the means are mounted in the load-cushioning device. Both of these provisions, either individually and collectively, allow for dynamic rate tuning in the three principle axes; vertical, fore and aft, and lateral.

DESCRIPTION OF DRAWINGS

The following description of the invention will be better understood by reference to the accompanying drawings wherein.

DETAILED DESCRIPTION OF DRAWING

Figure 1:
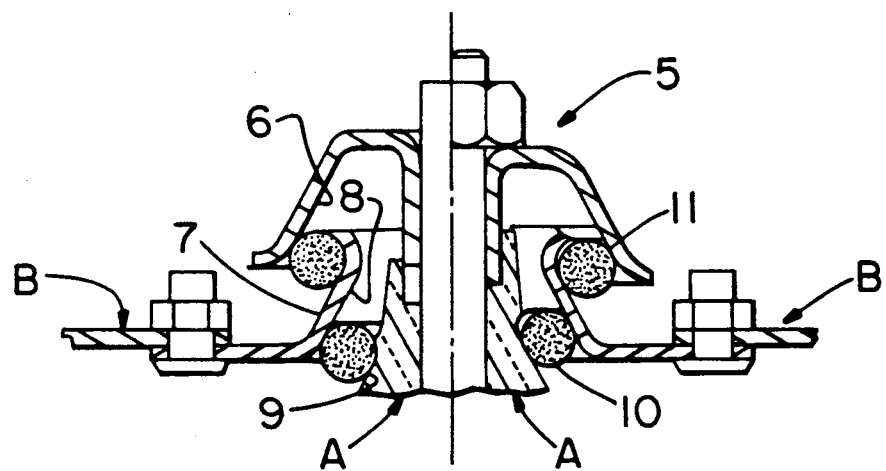
FIG. 1 is a split cross-section of a load cushioning device which employs elastomeric rings that are made in accordance with the invention, the left half of the figure being designed to show the device in a substantially unloaded position where the rings are in a relaxed uncompressed condition, and the right half of the figure showing the device in a loaded position where the rings are being compressed.

With general reference to the drawings for like parts and particular reference to FIG. 1, there is shown a load-cushioning device 5 which is positioned between two parts A and B of an automobile. The device 5 essentially comprises four concentrically-spaced, rigid conical metal surfaces 6 through 9 between which are placed a pair of different sized rubber doughnut or toroidally-shaped rubber rings 10,11 which rollingly and compressively engage the four conical surfaces 6 through 9 as relative movement between the parts A and B occurs bringing the surfaces 6 through 9 closer together.

Figure 2:
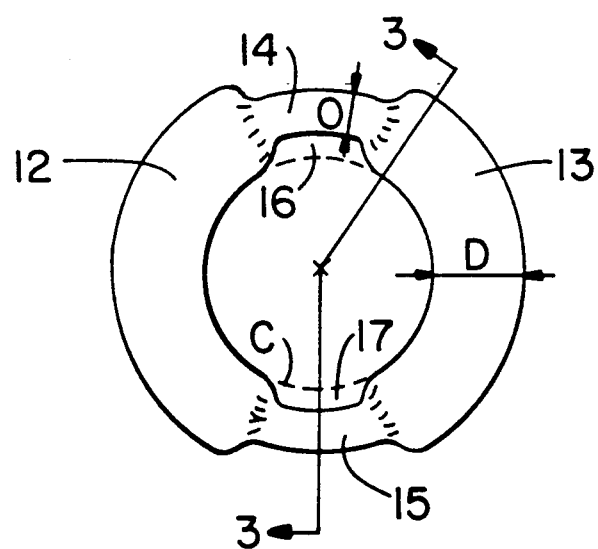
FIG. 2 is a plan view of the ring.
Figure 3:
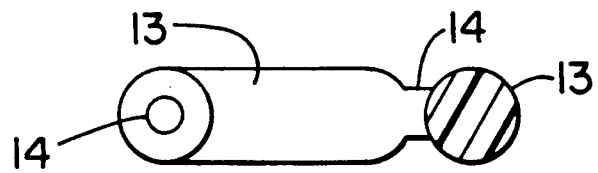
FIG. 3 is a section of the ring viewed from the line 3—3 of FIG. 2.

Each of the rings 10,11 as best seen in FIGS. 2 and 3 comprises a major pair of toroidal segments 12,13 which are connected by a much shorter pair of opposing toroidal segments 14,15 which are concentric with the longer toroidal segments 12,13 about the circular axis of the ring and which have smaller cross-sectional areas than those of the longer or larger toroidal segments 12,13 which, for example, have a diameter D which is twice the diameter d of the smaller toroidal segments 14,15.

In FIG. 2 a conical surface C is shown in dotted line to best reveal the pair of opposing recesses or voids 16 and 17 which are provided in the smaller, pinched areas of the smaller toroidal segments 14,15 adjacent the conical surface C. It can be appreciated that the foregoing described toroidal structural will provide unique resilient load-cushioning characteristics of the two different toroidal segments 12 and 13 and 14 and 15.

The angle of the support for the torus of the invention to the vertical axis of the load-cushioning device is important relative to the response rate of the device. Simply put, the more acute this angle, the softer or higher the vertical response rate becomes; the horizontal response rates, on the other hand, become harder or lessen as the conical angle, i.e., the angle of the support to the vertical axis decreases. While any of a number of elastomers may be used in the practice of the invention, rubber is preferred.

The durometer of the elastomer used to fabricate the toroidally-shaped ring of the invention contributes to a greater or lesser degree to the rate of response of the load-cushioning device. Put more simply, all other variables remaining constant, a higher durometer, i.e., harder rubber is deflected less than softer rubber.

The specific configuration of the torus of the invention likewise contributes to the response rate. Increasing the diameter of the torus increases the vehicle load carrying capability.

Figure 5:
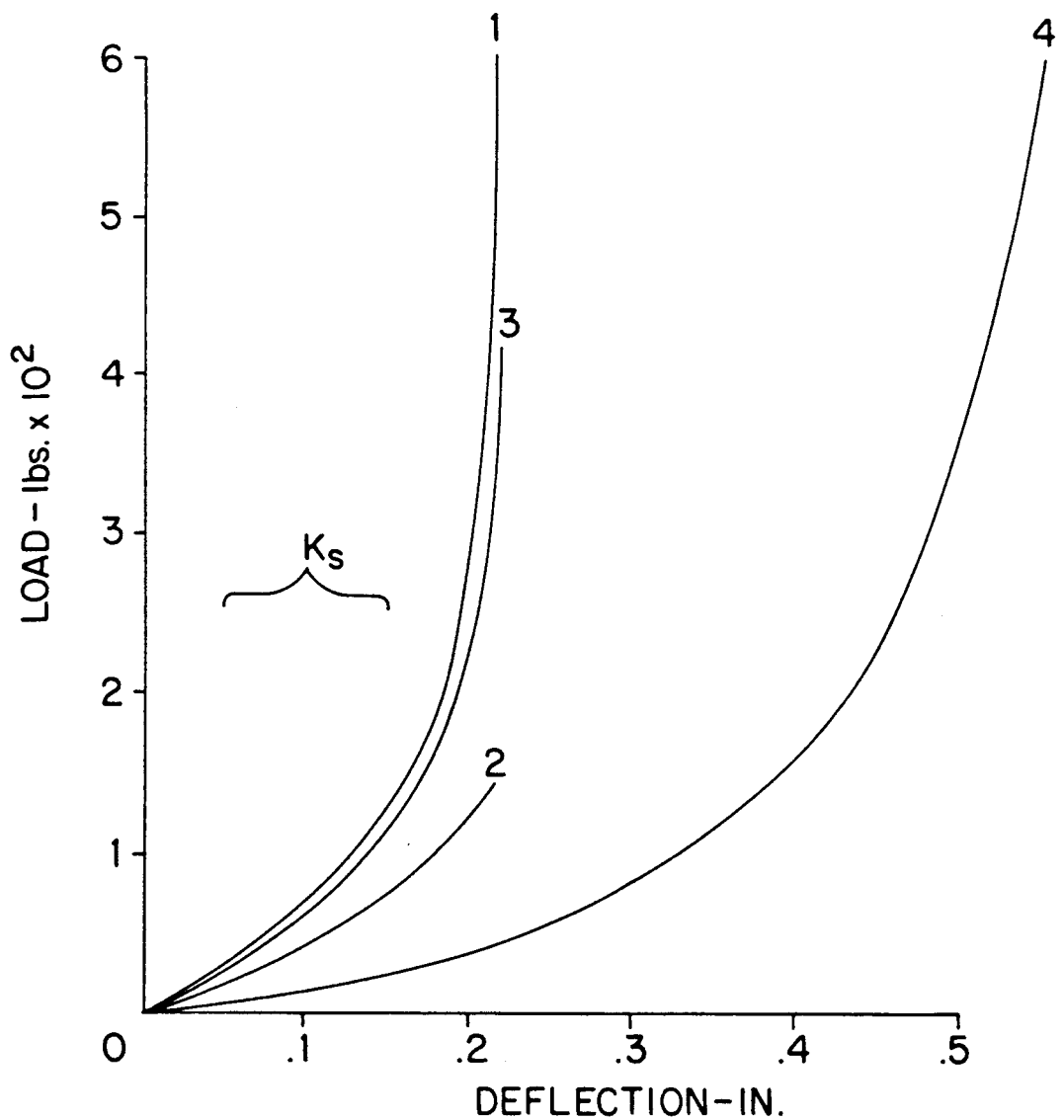
FIG. 5 is a graphic representation of the use of the invention, e.g. different horizontal reaction responses are obtained by rotating the torus.

The relative diameters of the major pair of toroidal segments to the shorter pair of segments contributes to response rates in the horizontal plane. When one of the rolling rubber rings of the invention is rotated relative to the other, for example at an angle of 45°, the load deflection changes. This is readily apparent from FIG. 5 where it can be seen that the value of curve 3 lies between the values for curves 1 and 2.

Figure 4:
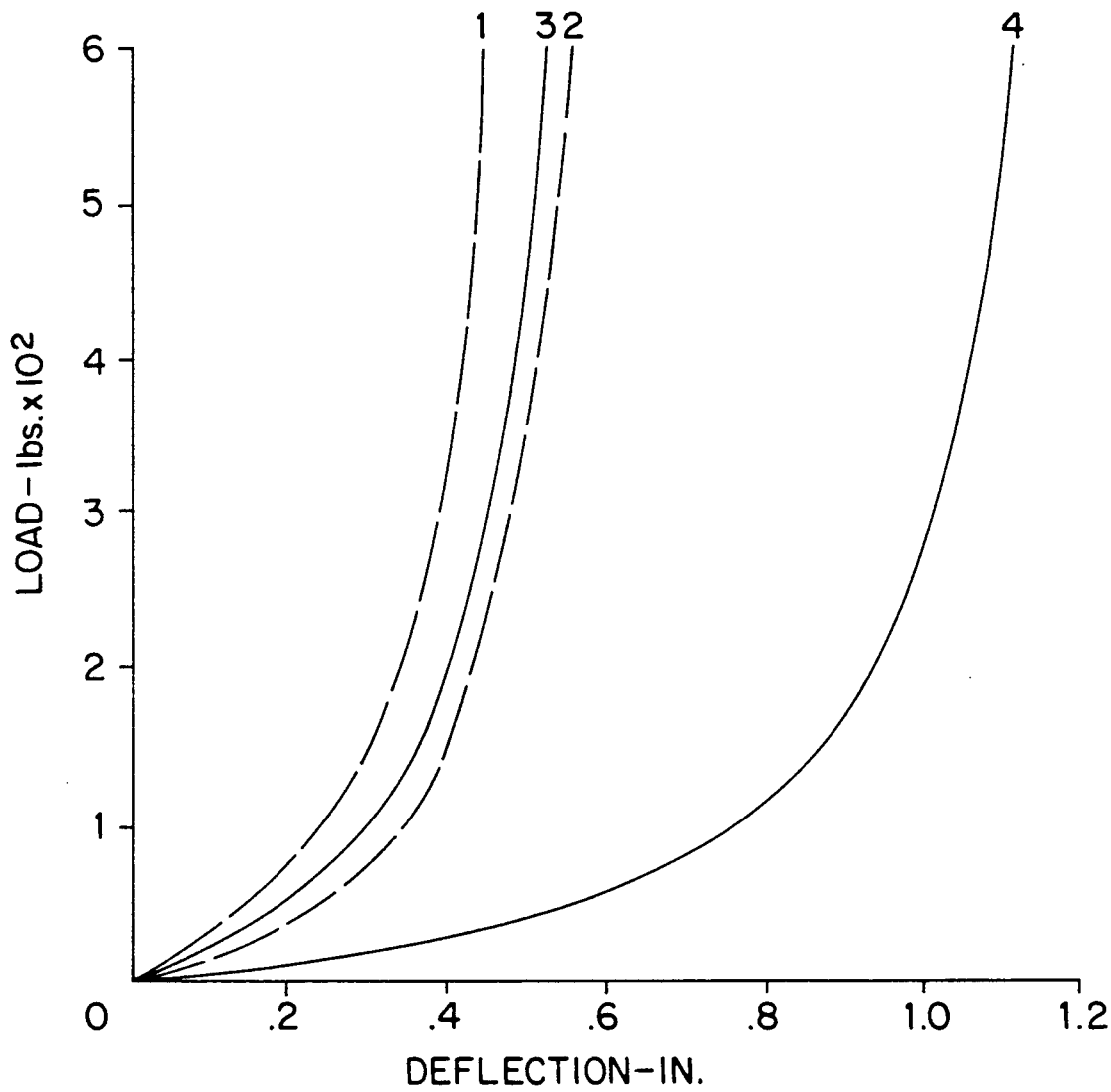
FIG. 4 is a graphic representation of the effect of rubbers of different durometers and different core angles on reaction response.

As will be apparent from a comparison of values 2 and 3 in FIG. 4, the opening reduction in cross-section of the torus of the invention does not affect substantially the performance characteristics of the torus with respect to the vertical response rate.

Thus there has been described a unique rolling, resilient rubber torus or ring which can be designed to resiliently respond to different laterally imparted loads in, for example, radial directions against the ring, contrary to the prior art rings which have uniform cross-sections throughout their annular length so that they will respond against any lateral load in the same manner. Inherently this design, because of the rolling capability of each individual torus, provides low resistance to conical deflection.

The preferred embodiment shown and described herein is merely exemplary of the invention. In the light of the foregoing description and the drawings, changes and modifications will occur to those skilled in the art without departing from the spirit and scope of the invention as defined in the claims.

What is claimed is:

1. A cushioning device comprising:
   (a) at least one pair of concentrically disposed, rigid conical surfaces in spaced relation; and
   (b) a resilient, toroidally-shaped elastomeric ring disposed freely between the conical surfaces for rolling, compressive engagement with the surfaces as they come closer together, the ring having a pair of similar opposing longer toroidal segments of uniform circular cross-sections, connected by a pair of similar opposing shorter toroidal segments of uniform circular cross-sections, the shorter toroidal segments being concentric with the two longer toroidal segments about the circular axis of the ring and having a substantially shorter arcuate length than that of the longer toroidal segments, the shorter toroidal segments having cross-sections which are substantially smaller than those of the longer toroidal segments, such that recesses are formed between the ring and adjacent conical surfaces in the areas of the shorter toroidal segments.

2. The device of claim 1 wherein the ring is composed of elastic rubbery material.

3. A toroidally-shaped, resilient ring freely disposed between a pair of concentrically-spaced conical surfaces for rolling, compressive engagement with said surfaces as they move relatively closer to one another, comprising:
   (a) a pair of similar, opposing, longer toroidal segments which have adjacent opposing ends; and
   (b) a pair of similar opposing substantially shorter toroidal segments which connect opposing ends of the longer toroidal segments which have substantially larger, uniform circular cross-sections throughout than those of the shorter toroidal segments.

4. The ring of claim 3 wherein the loner and shorter toroidal segments are concentrically disposed about the circular axis of the ring such that opposing arcuate recesses are formed around the inner surface of the ring in the areas of the shorter toroidal segments.

5. The ring of claim 4 wherein the ring is composed of rubber.

* * * * *